(12) United States Patent
Datta et al.

(10) Patent No.: US 10,671,466 B2
(45) Date of Patent: *Jun. 2, 2020

(54) SECURE TUNNELING ACCESS TO DEBUG TEST PORTS ON NON-VOLATILE MEMORY STORAGE UNITS

(71) Applicant: Intel Corporation, Santa Clara, CA (US)

(72) Inventors: Shamanna M. Datta, Hillsboro, OR (US); Murugasamy K. Nachimuthu, Beaverton, OR (US); Mahesh S. Natu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 15/707,475

(22) Filed: Sep. 18, 2017

(65) Prior Publication Data

US 2018/0067794 A1 Mar. 8, 2018

Related U.S. Application Data

(63) Continuation of application No. 14/862,488, filed on Sep. 23, 2015, now Pat. No. 9,766,963.

(51) Int. Cl.
*G06F 11/07* (2006.01)
*G06F 11/263* (2006.01)
(Continued)

(52) U.S. Cl.
CPC ...... *G06F 11/0727* (2013.01); *G06F 11/1666* (2013.01); *G06F 11/2215* (2013.01);
(Continued)

(58) Field of Classification Search
CPC ............. G06F 11/3003; G06F 11/3089; G06F 11/3648; G06F 11/3688; G06F 11/25; G06F 11/1417; G06F 11/079
See application file for complete search history.

(56) References Cited

U.S. PATENT DOCUMENTS 7,660,412 B1  2/2010  Lee
7,917,818 B2 * 3/2011  Niijima ................... G06F 21/74
              714/30

(Continued)

OTHER PUBLICATIONS

Office Action for U.S. Appl. No. 14/862,488, dated Dec. 22, 2016, 9 pages.

(Continued)

*Primary Examiner* — Nadeem Iqbal
(74) *Attorney, Agent, or Firm* — Jordan IP Law, LLC

(57) ABSTRACT

Systems, apparatuses and methods may provide for receiving one or more debug communications and programming, via a bus, a set of debug registers with debug information corresponding to the one or more debug communications. Additionally, tunnel logic hardware may be instructed to transfer the debug information from the set of debug registers to one or more test access ports of an intelligent device such as a non-volatile memory storage unit having a microcontroller. In one example, if it is detected that debug permission has been granted during a boot process, a control status register may be unlocked. If, on the other hand, the debug permission is not detected during the boot process, the control status register may be locked. Accordingly, an enable bit of the control status register may be used to activate the tunnel logic hardware only if the control status register is unlocked.

20 Claims, 5 Drawing Sheets

(51) Int. Cl.
*G06F 11/22* (2006.01)
*G06F 11/16* (2006.01)
*G06F 12/14* (2006.01)
*G06F 11/36* (2006.01)

(52) U.S. Cl.
CPC ...... *G06F 11/2635* (2013.01); *G06F 11/3656* (2013.01); *G06F 12/1425* (2013.01); *G06F 2212/1052* (2013.01)

(56) References Cited

U.S. PATENT DOCUMENTS

| | | | |
|---|---|---|---|
| 7,934,076 B2* | 4/2011 | Fischer | G06F 21/74 |
| | | | 712/200 |
| 7,984,352 B2 | 7/2011 | Greb | |
| 9,766,963 B2* | 9/2017 | Datta | G06F 11/0727 |
| 2006/0075312 A1 | 4/2006 | Fischer et al. | |
| 2008/0115108 A1* | 5/2008 | Gunji | G06F 11/3648 |
| | | | 717/124 |
| 2013/0019305 A1 | 1/2013 | Berenbaum et al. | |
| 2013/0212425 A1* | 8/2013 | Blaine | G06F 11/3648 |
| | | | 714/6.1 |
| 2016/0261455 A1* | 9/2016 | Su | H04L 41/069 |

OTHER PUBLICATIONS

Notice of Allowance for U.S. Appl. No. 14/862,488, dated May 22, 2017, 5 pages.

* cited by examiner

SECURE TUNNELING ACCESS TO DEBUG TEST PORTS ON NON-VOLATILE MEMORY STORAGE UNITS

CROSS REFERENCE TO RELATED APPLICATIONS

This application is a continuation of U.S. patent application Ser. No. 14/862,488 filed Sep. 23, 2015, patented as U.S. Pat. No. 9,766,963 on Sep. 19, 2017.

TECHNICAL FIELD

Embodiments generally relate to intelligent devices/memory structures. More particularly, embodiments relate to secure tunneling access to debug test ports on devices such as non-volatile memory storage units.

BACKGROUND

Non-volatile memory (NVM) may provide persistent storage of data in dual inline memory modules (DIMMs) having a standardized pin configuration (e.g., pinout) and form factor. Recent NVM developments may incorporate a microcontroller into each DIMM, wherein the microcontroller may perform relatively complex functions such as, for example, partitioning non-volatile data from volatile data, enforcing reliability/availability/serviceability (RAS), conducting encryption operations, managing cell aging, and so forth. The complexity of these functions may lead to debugging challenges. For example, conventional Joint Test Action Group (JTAG) debugging solutions may call for adding pins and/or debug connectors to each DIMM, whereas the standardized pinout and form factor may render such an approach impractical.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
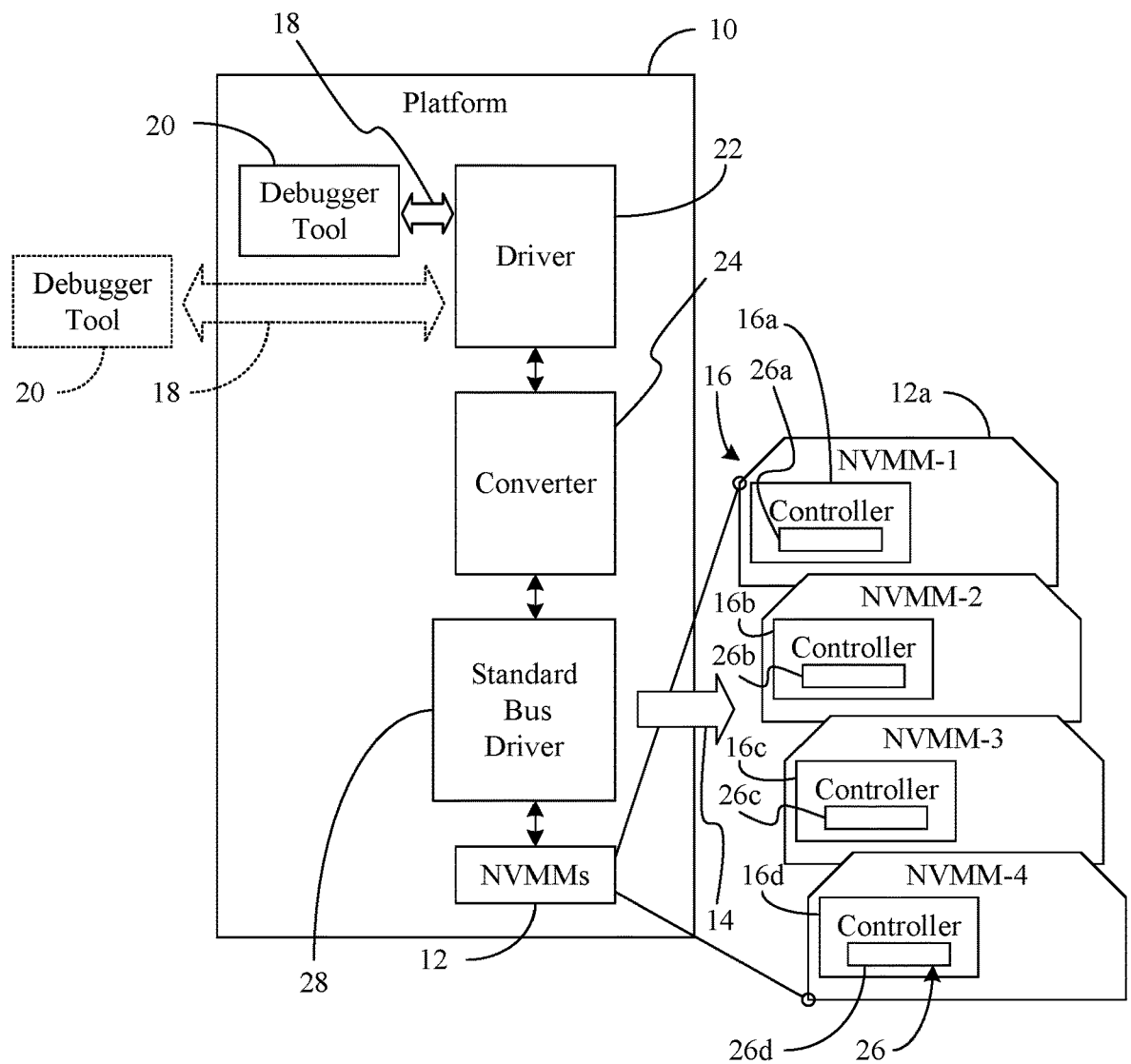
FIG. 1 is a block diagram of an example of a platform according to an embodiment.

Turning now to FIG. 1, a platform 10 (e.g., security-enhanced memory system) is shown in which intelligent devices such as one or more non-volatile memory modules (NVMMs) 12 (12a-12d) include corresponding microcontrollers 16 (16a-16d). The platform 10 may generally be part of an electronic device/system having computing functionality (e.g., personal digital assistant/PDA, notebook computer, tablet computer, server), communications functionality (e.g., smart phone), imaging functionality, media playing functionality (e.g., smart television/TV), wearable functionality (e.g., watch, eyewear, headwear, footwear, jewelry), vehicular functionality (e.g., car, truck, motorcycle), etc., or any combination thereof. In one example, the NVMMs 12 are double data rate (DDR) dynamic random access memory (DRAM) structures configured as dual inline memory modules (DIMMs), although other memory configurations may also be used depending on the circumstances. Moreover, the NVMMs 12 may include phase change memory (PCM), three dimensional cross point memory, resistive memory, nanowire memory, ferro-electric transistor random access memory (FeTRAM), flash memory such as NAND or NOR, magnetoresistive random access memory (MRAM) memory that incorporates memristor technology, spin transfer torque (STT)-MRAM, and so forth.

The microcontrollers 16 may perform relatively complex functions such as, for example, partitioning non-volatile data on the NVMMs 12 from volatile data on the NVMMs 12, enforcing reliability/availability/serviceability (RAS), conducting encryption operations, managing cell aging, and so forth. Due to the complex nature of the functions performed by the microcontrollers 16, troubleshooting of the microcontrollers 16 may be appropriate during the manufacture, assembly, test, operation and/or repair of the platform 10. Accordingly, the illustrated platform 10 exchanges one or more debug communications 18 with a debugger tool 20 running locally on the platform 10 and/or remotely from the platform 10.

A driver 22 (e.g., network driver, Universal Serial Bus/USB driver, etc.) may collect the debug communications 18 and provide them to a converter 24 (e.g., tunnel driver) that may generally convert the debug communications 18 into a format that complies with a bus 14 (e.g., dynamic random access memory/DRAM bus, SMBus/System Management Bus, or other standard transaction bus that is not dedicated to debugging operations) and includes the payload of the debug communications 18. As will be discussed in greater detail, the converter 24 may use a standard bus driver 28 to communicate with the tunnel logic hardware 26 (26a-26d) that resides in the microcontrollers 16, wherein the tunnel logic hardware 26 may transfer the payload of the debug communications 18 to test access ports (TAPs, not shown) in the NVMMs 12.

Of particular note is that the illustrated platform 10 is able to securely route the debug communications 18, which may include, for example, halt commands, code break point commands, instruction register/IR shift and pause commands, IR shift and update commands, data register/DR shift and pause commands, DR shift and update commands, reset commands, and other debug payload from the debugger tool 20 to the NVMMs 12 without using additional pins or debug connectors. Accordingly, the illustrated platform 10 may provide a practical solution to debugging complex memory structures that enables standardized pinouts and form factors to be used. Although the illustrated NVMMs 12 are shown as memory structures, the debug communications 18 may also be tunneled to other intelligent devices such as network devices (e.g., in order to track outgoing transactions, monitor internal controller states, inject new transactions, etc., without the use of external routers or switches).

Figure 2:
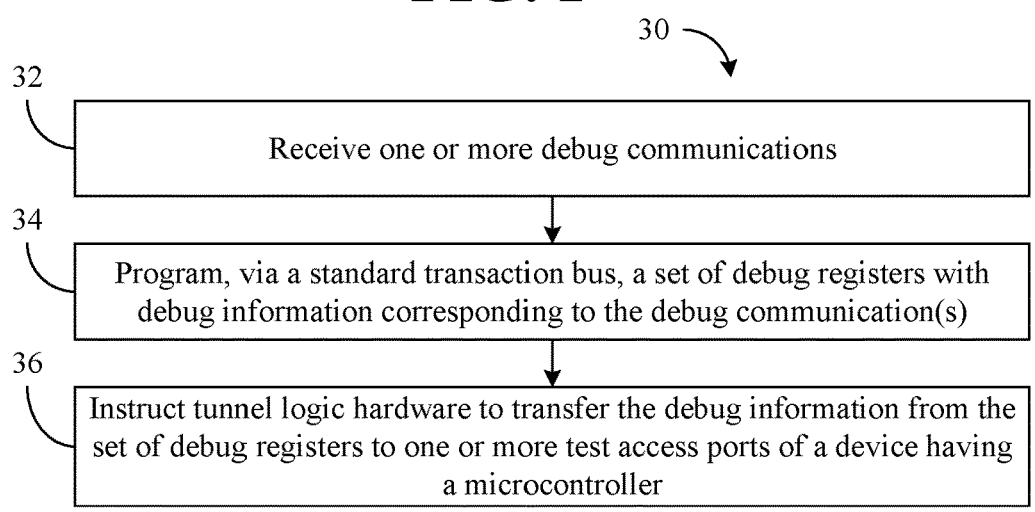
FIG. 2 is a flowchart of an example of a method of operating a converter according to an embodiment.

FIG. 2 shows a method 30 of operating a converter such as, for example, the converter 24 (FIG. 1), already discussed. The method 30 may be implemented in one or more modules as a set of logic instructions stored in a machine- or computer-readable non-transitory storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 30 may be written in any combination of one or more programming languages, including an object oriented programming language such as JAVA, SMALLTALK, C++ or the like and conventional procedural programming languages, such as the "C" programming language or similar programming languages.

Illustrated processing block 32 provides for receiving one or more debug communications such as, for example, halt commands, code break point commands, IR shift and pause commands, IR shift and update commands, DR shift and pause commands, DR shift and update commands, reset commands, and so forth. Block 34 may program, via a standard transaction bus (e.g., DRAM bus, SMBus), a set of debug registers with debug information corresponding to the one or more debug communications. Additionally, tunnel logic hardware may be instructed at block 36 to transfer the debug information from the set of debug registers to one or more test access ports (e.g., industry standard JTAG test ports) of a device such as, for example, a non-volatile memory storage unit, network device, etc., having a relatively complex microcontroller.

Figure 3A:
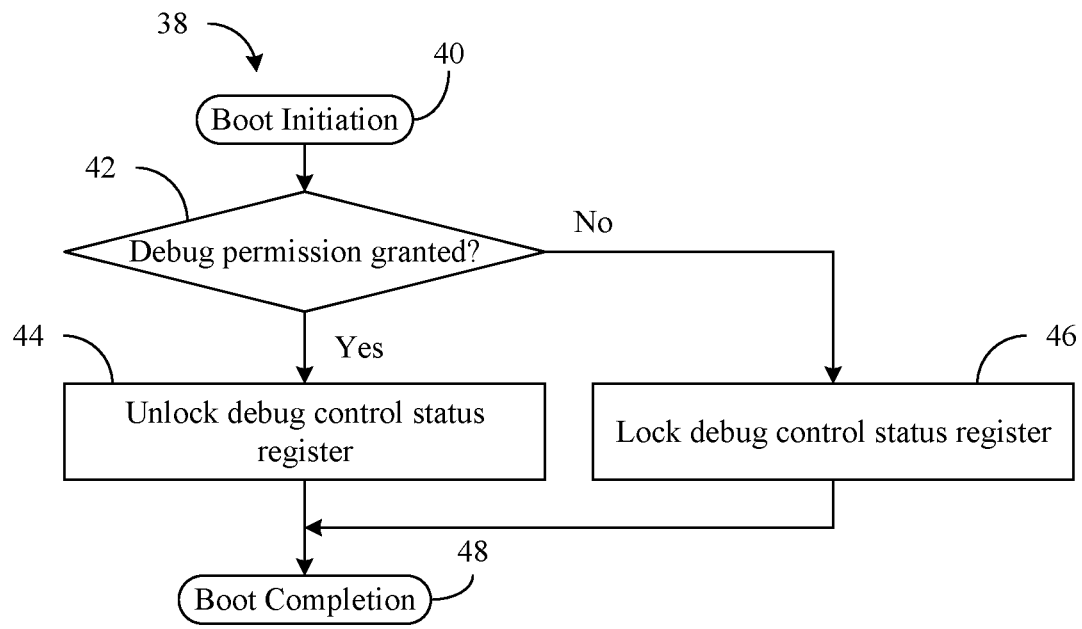
FIGS. 3A and 3B are flowcharts of examples of securing tunneling access according to embodiments.

FIG. 3A shows a method 38 of securing tunnel access for debug during a boot process. The method 38 may generally be implemented in platform firmware or software components such as BIOS (basic input/output system, e.g., on which a DIMM is hosted), a debugger tool or converter such as, for example, the converter 24 (FIG. 1), already discussed. More particularly, the method 38 may be implemented in one or more modules as a set of logic instructions stored in a machine- or computer-readable non-transitory storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 40 provides for initiation of the boot process, wherein a determination may be made at block 42 as to whether debug permission has been granted during the boot process by a legitimate owner of the platform. In this regard, block 42 may include determining whether a user of the system has pressed an appropriate key or otherwise entered a debug authorization code during an early BIOS boot period (e.g., since BIOS typically controls the ownership of the system during boot). If so, illustrated block 44 unlocks a debug control status register (CSR). Block 44 may include, for example, clearing a lock status bit in the CSR. Otherwise, block 46 may lock the debug CSR (e.g., by setting the lock status bit in the CSR). As will be discussed in greater detail, the CSR may enable the platform to achieve a self-locking functionality that obviates concern over unauthorized debugging operations being conducted by malware and/or an attacker. The debug CSR may therefore be contained in a NVDIMM (non-volatile dual inline memory module) architecture. The boot process may complete at block 48.

Figure 3B:
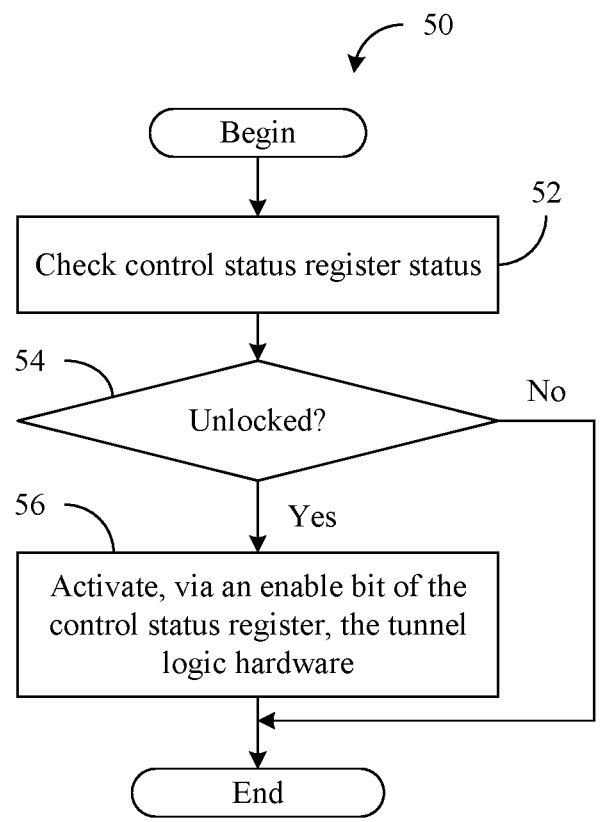

FIG. 3B shows a method 50 of securing tunnel access after completion of a boot process. The method 50 may generally be implemented after the method 38 (FIG. 3A) in a debugger tool (e.g., that runs after BIOS completes booting the platform) or a converter such as, for example, the converter 24 (FIG. 1), already discussed. More particularly, the method 50 may be implemented in one or more modules as a set of logic instructions stored in a machine- or computer-readable non-transitory storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 52 may provide for checking a status of a debug control status register. Block 52 may include reading a lock status bit of the CSR. If it is determined at block 52 that the CSR is unlocked (e.g., the lock status bit is cleared, indicating the platform owner's permission to debug the platform components) block 56 may activate, via an enable bit of the CSR, tunnel logic hardware such as, for example, the tunnel logic hardware 26 (FIG. 1). On the other hand, if it is determined at block 52 that the CSR is not unlocked (e.g., the lock status bit is set), the illustrated method 50 is forced to terminate without activating the tunnel logic hardware. The tunnel logic hardware may respond to debug information transfer instructions such as the instruction in block 36 (FIG. 2) only when the enable bit of the CSR is set. Since the CSR may be locked unless debug permission is received early in the boot process, the illustrated solution provides for secure tunneling access to debug test ports on NVM. Table I below shows one approach to configuring the CSR.

TABLE I

| Field Name | Bits | Attribute | Default | Description |
| --- | --- | --- | --- | --- |
| dwe | 31:31 | ROVP | 0x0 | Debug Was Enabled: Hardware sets this bit to indicate that debug was enabled. |
| lock | 30:30 | RWVP | 0x0 | Lock: 0 = unlocked 1 = locked When set, locks this register from further changes until next assertion of Reset. The default value is loaded from fuses. |
| dbg_en | 0:0 | RWVP | 0x0 | Debug Enable: 0 = debug disabled 1 = debug enabled The default value is loaded from fuses. When lock is set, this field will not change until the next assertion of Reset. |

In Table I, bits 1-29 may be reserved (meaning are forced to zero in this implementation), RO stands for read only, RW stands for read/write from code when unlocked, V stands for an attribute that can be changed by hardware at any time (even when locked), and P means the value is "sticky" until the DIMM encounters a hardware reset.

Figure 4:
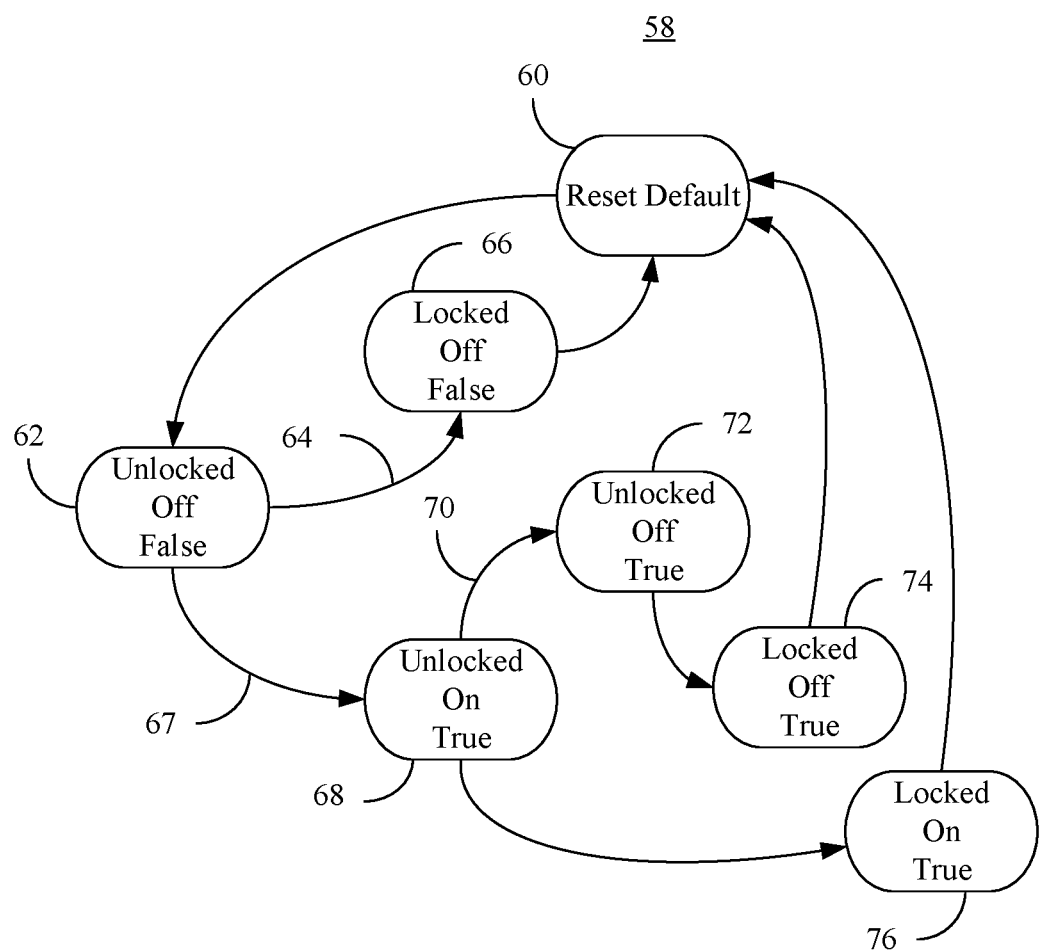
FIG. 4 is a state diagram of an example of a control status register according to an embodiment.

FIG. 4 shows a state machine 58 that describes a control status register. In the illustrated example, upon detecting a system reset, default values may be loaded from fuses at state 60. The control status register may then enter an "Unlocked Off False" state 62 (e.g., the locked bit is cleared). Most normal boots may automatically follow a transition path 64 to the "Locked Off False" state 66 (e.g., the locked bit is set), when a platform owner does not opt-in to a debug session (for example, through a BIOS code option). The transition to the locked state may occur in response to controller FW detecting a mandatory boot event such as a media lock command from user.

If, on the other hand, it is detected that debug permission has been granted during the boot process, the state machine 58 may follow a transition 67 to the "Unlocked On True" state 68 (e.g., the locked bit remains cleared). If the user subsequently disables debugging, the illustrated state machine 58 follows a transition 70 to the "Unlocked Off True" state 72 (e.g., the locked bit is set). The user may enable debugging again and place the state machine 58 in the "Locked Off True" state 74. Alternatively, when in the "Unlocked On True" state 68, either the user locks debugging or the detection of malware forces a lock event, the state machine 58 may transition to the "Locked On True" state 76. Memory or other device HW (hardware) may also detect and set a "DWE (Debug Was Enabled)" bit in HW to essentially inform any upper layer VMM (virtual machine monitor) and OS (operating system) layer components that debug was attempted on this device. The HW set status bit, which may be immutable by software/malware, may enable security conscious VMMs/OSs to enforce user driven policy decisions as to whether the platform is allowed into a trusted compute pool or not. Accordingly, debug message tunnel HW may yield to security conscious debug methodologies.

Figure 5:
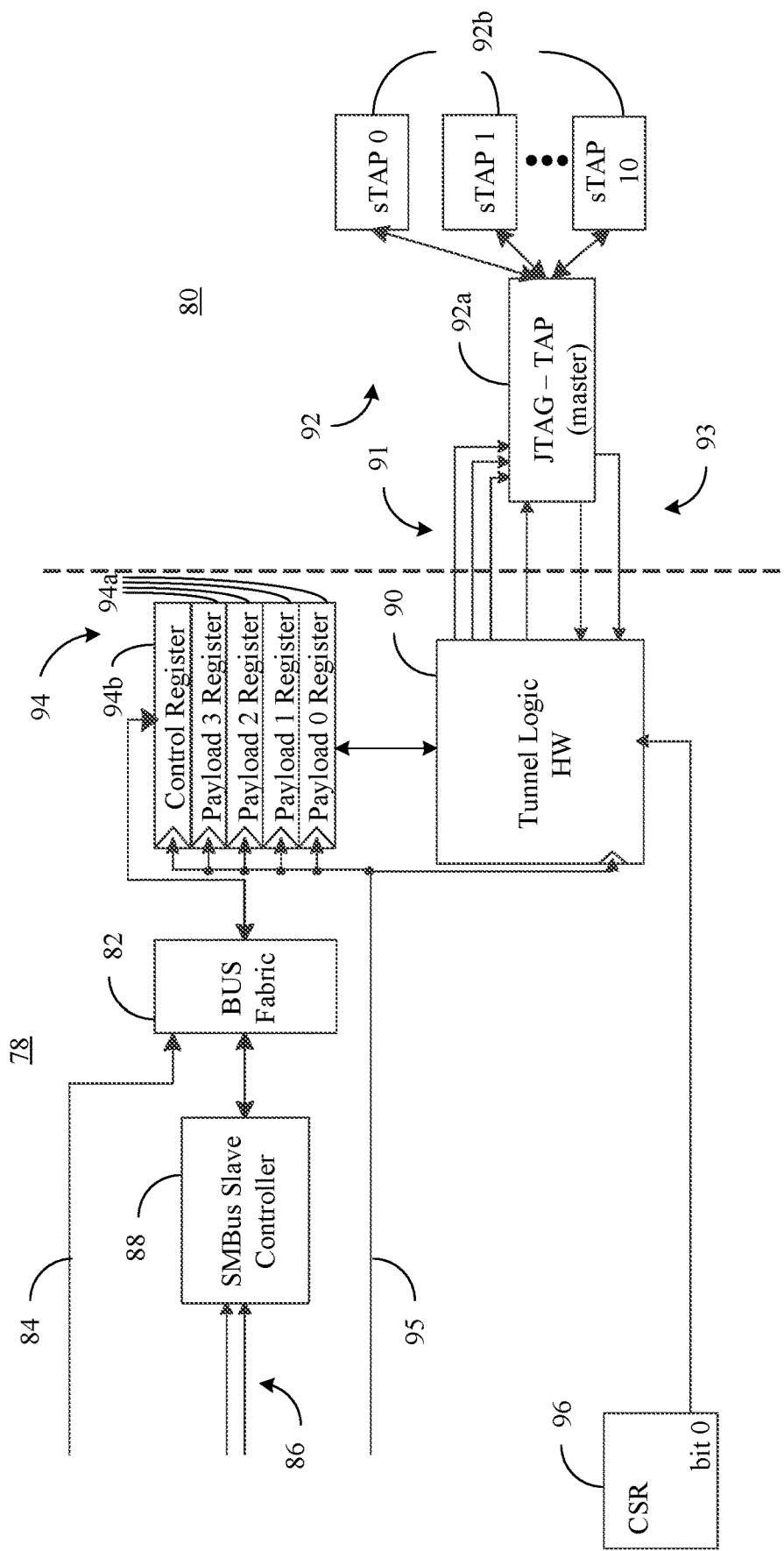
FIG. 5 is a circuit schematic of an example of a tunnel logic hardware interface according to an embodiment.

Turning now to FIG. 5, a tunnel logic hardware interface 78 to a debug port controller 80 is shown, wherein the debug port controller 80 may generally be incorporated into a device (not shown) such as, for example, one or more of the NVMMs 12 (FIG. 1), a network device, and so forth. In the illustrated example, a bus fabric 82 (e.g., standard transaction bus) is coupled directly to a DRAM link 84 (e.g., DDR input) and to an SMBus link 86 via an SMBus slave controller 88. The bus fabric 82 may generally receive converted debug communications over the links 84, 86 from a converter (not shown) such as, for example, the converter 24 (FIG. 1), already discussed. More particularly, the interface 78 may include a set of debug registers 94 (94a, 94b) coupled to the bus fabric 82 and tunnel logic hardware 90 coupled to one or more test access ports 92 in the debug port controller 80 of the device. In one example, the converter receives one or more debug communications and programs, via the bus fabric 82, the set of debug registers 94 with debug information corresponding to the one or more debug communications. Additionally, the converter may instruct the tunnel logic hardware 90 to transfer the debug information from the set of debug registers 94 to the test access ports 92. The debug registers 94 and the tunnel logic hardware 90 may operate based on a common clock 95.

In the illustrated example, the converter writes payload information to one or more payload registers 94a in the set of debug registers 94 and writes control information to a control register 94b in the set of debug registers 94. The control information may generally include a debug command, a shift amount, a start signal, etc., wherein the start signal is programmed when the payload information is ready for transfer from the payload registers 94a. Table II below shows one approach to configuring the control register 94b.

TABLE II

| Field Name | Bits | Attribute | Default | Description |
|---|---|---|---|---|
| testport_shft | 11:4 | RW | 0x0 | Shift Amt: Shift Amount. 0-128 d (0-80 h) are valid values Other values are reserved |
| testport_cmd | 3:1 | RW | 0x0 | Command: 000: IR Shift and Pause 001: IR Shift and Update 010: DR Shift and Pause 011: DR Shift and Update 100: Reset Other values are reserved |
| start_testport_cmd | 0:0 | RWV | 0x0 | Start: When set to 1, the command selected by the testport_tunnel_ctrl.cmd is initiated. Hardware clears this bit when the operation is complete. |

Thus, the bits in the control register 94b may determine the size of the shift chain being accessed and whether the tunnel logic hardware 90 will access an instruction register or a data register in the debug controller or test port as described herein. As already noted, the converter may conduct a "doorbell" write to the Start bit to instruct the tunnel logic hardware 90 to begin the debug information transfer.

The tunnel logic hardware 90 may generally communicate with the test access ports 92 via standard outgoing lines 91 (e.g., test data in/TDI, test reset/TRST, test mode set/TMS, test clock/TCK) and incoming lines 93 (e.g., test data out/TDO, state). More particularly, the values of the payload registers 94a may be set according to what is expected to be shifted into the test access ports 92. For instance, if the shift amount is less than thirty-two bits, programming only the "Payload 0 Register" may be sufficient. Otherwise, the other payload registers 94a may be programmed as well. Bit 0 of the payload registers 94a may be shifted into a test data in (TDI) port of a master test access port (TAP) 92a, followed by bit 1, bit 2, and so forth. The master TAP 92a may in turn direct the TDI data to an appropriate slave TAP 92b. Table III below shows one approach to configuring a payload register 94a.

TABLE III

| Field Name | Bits | Attribute | Default | Description |
|---|---|---|---|---|
| testport_data | 31:0 | RWV | 0x0 | Data: Data |

In addition, a control status register 96 may be coupled to the tunnel logic hardware 90, wherein the converter may selectively activate the tunnel logic hardware 90 via an enable bit (e.g., "Bit 0") of the control status register 96. Such an approach may prevent malware from compromising system integrity as already described with regard to FIG. 4.

The enable bit may be tapped off from the control status register 96 as a hardware signal.

Figure 6:
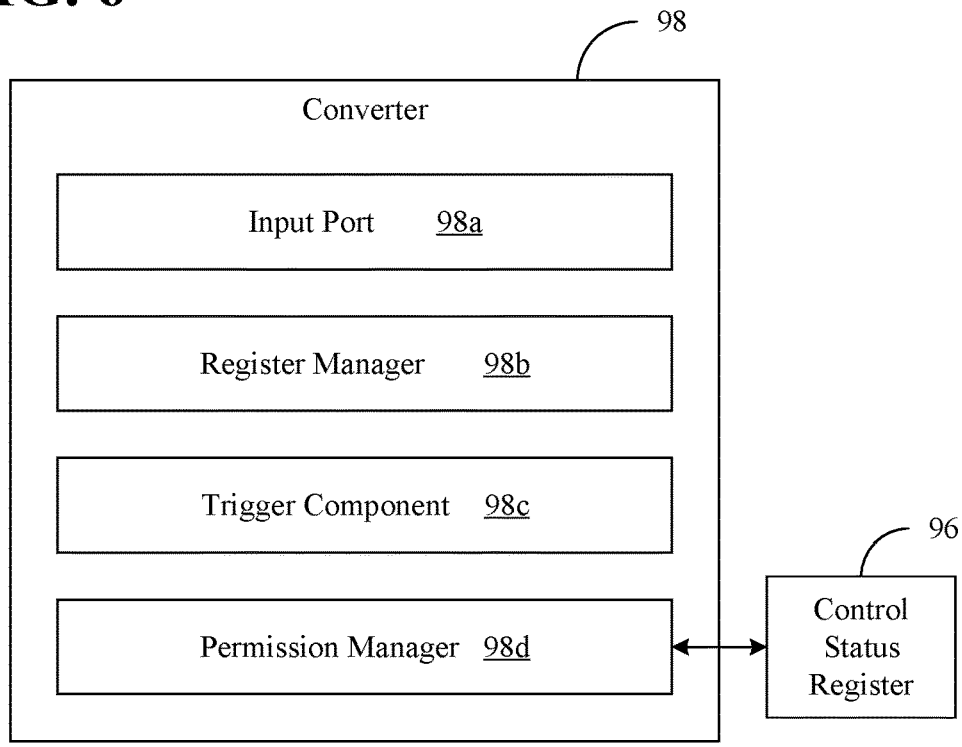
FIG. 6 is a block diagram of an example of a converter according to an embodiment.

FIG. 6 shows a converter 98 (98a-98d) that may be used to facilitate the tunneling of debug commands to a test access port of an intelligent device such as, for example, anon-volatile memory storage unit and/or network device with a microcrontroller, via a standard transaction bus such as, for example, the bus fabric 82 (FIG. 5). Thus, the converter 98 may have similar functionality to that of converter 24 (FIG. 1), and may implement one or more aspects of the method 30 (FIG. 2), the method 38 (FIG. 3A) and/or the method 50 (FIG. 3B). The converter 98 may include an input port 98a to receive one or more debug communications and a register manager 98b to program, via the standard transaction bus, a set of debug registers with debug information corresponding to the one or more debug communications. Additionally, a trigger component 98c may instruct tunnel logic hardware to transfer the debug information from the set of debug registers to one or more of the test access ports. In one example, the register manager 98b writes payload information to the one or more payload registers in the set of debug registers and writes control information to a control register in the set of debug registers. The control information may include a debug command, a shift amount and/or a start signal, wherein the start signal is programmed when the payload information is ready for transfer from the one or more payload registers.

Moreover, security may be enhanced by using a permission manager 98d to detect that debug permission has been granted during a boot process. In such a case, the permission manager 98d may unlock the control status register 96. If, on the other hand, the debug permission is not detected during the boot process, the permission manager 98d may lock the control status register 96. The permission manager 98d may also activate, via an enable bit of the control status register 96, the tunnel logic hardware only if the control status register 96 is unlocked. The permission manager 98d may alternatively reside in tunnel logic hardware such as, for example, the tunnel logic hardware 90 (FIG. 5), already discussed. The converter 98 may include logic instructions, configurable logic, fixed-functionality hardware, etc., or any combination thereof.

Figure 7:
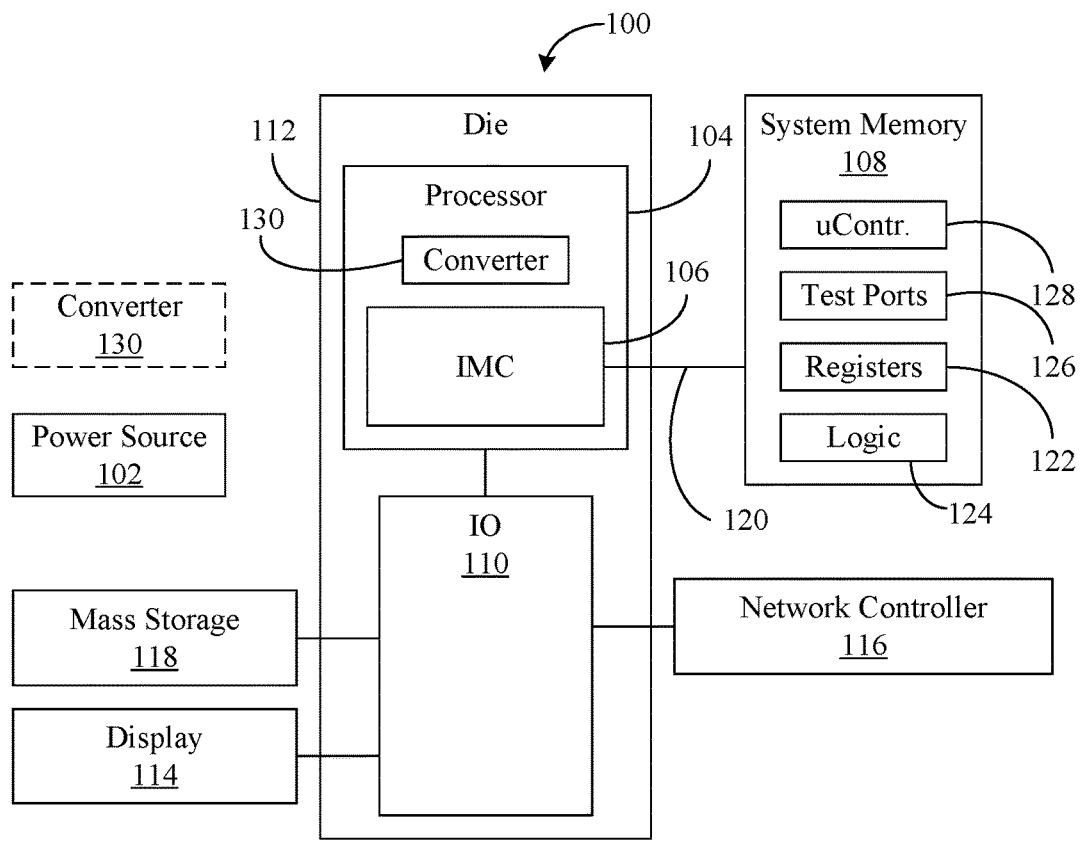
FIG. 7 is a block diagram of an example of a computing system according to an embodiment.

FIG. 7 shows a security-enhanced computing system 100. The computing system 100 may generally be part of an electronic device/platform having computing functionality (e.g., personal digital assistant/PDA, notebook computer, tablet computer, server), communications functionality (e.g., smart phone), imaging functionality, media playing functionality (e.g., smart television/TV), wearable functionality (e.g., watch, eyewear, headwear, footwear, jewelry), vehicular functionality (e.g., car, truck, motorcycle), etc., or any combination thereof. In the illustrated example, the system 100 includes a power source 102 to supply power to the system 100 and a processor 104 having an integrated memory controller (IMC) 106, which may communicate with system memory 108 via a bus 120 such as, for example, a system management bus or a dynamic random access memory bus. The system memory 108 may include, for example, dynamic RAM (DRAM) configured as one or more memory modules such as, for example, dual inline memory modules (DIMMs), small outline DIMMs (SODIMMs), etc.

The illustrated system 100 also includes an input output (IO) module 110 implemented together with the processor 104 on a semiconductor die 112 as a system on chip (SoC), wherein the IO module 110 functions as a host device and may communicate with, for example, a display 114 (e.g., touch screen, liquid crystal display/LCD, light emitting diode/LED display), a network controller 116, and mass storage 118 (e.g., hard disk drive/HDD, optical disk, flash memory, etc.). The processor 104 may include a converter 130 having an input port to receive one or more debug communications, a register manager to program, via the bus 120, a set of debug registers 122 with debug information corresponding to the one or more debug communications, and a trigger component to instruct tunnel logic hardware 124 to transfer the debug information from the set of debug registers 122 to one or more test ports 126. The debug information may be used to troubleshoot and/or repair one or more microcontrollers 128 of the system memory 108. Thus, the converter 130 may function similarly to the converter 24 (FIG. 1) and/or the converter 98 (FIG. 6) and may implement one or more aspects of the method 30 (FIG. 2). Additionally, the tunnel logic hardware 124 may function similarly to the tunnel logic hardware 26 (FIG. 1) and/or the tunnel logic hardware 90 (FIG. 5). The converter 130, which may be implemented in logic instructions, configurable logic and/or fixed-functionality logic hardware, may optionally be implemented elsewhere in the system 100.

ADDITIONAL NOTES AND EXAMPLES:

Example 1 may include a security-enhanced memory system comprising a non-volatile memory storage unit including a microcontroller and one or more test access ports, a bus, tunnel logic hardware coupled to at least one of the one or more test access ports, a set of debug registers coupled to the bus, and a converter including an input port to receive one or more debug communications, a register manager to program, via the bus, the set of debug registers with debug information corresponding to the one or more debug communications, and a trigger component to instruct the tunnel logic hardware to transfer the debug information from the set of debug registers to the one or more test ports.

Example 2 may include the system of Example 1, further including a control status register, wherein the converter includes a permission manager to detect that debug permission has been granted during a boot process, unlock the control status register in response to detection of the debug permission being granted during the boot process, and lock the control status register if the debug permission is not detected during the boot process.

Example 3 may include the system of Example 2, wherein the permission manager is to activate, via an enable bit of the control register, the tunnel logic hardware if the control status register is unlocked.

Example 4 may include the system of Example 1, wherein the register manager is to write payload information to one or more payload registers in the set of debug registers and write control information to a control register in the set of debug registers.

Example 5 may include the system of Example 4, wherein the control information is to include a debug command, a shift amount and a start signal, and wherein the start signal is to be programmed when the payload information is ready for transfer from the one or more payload registers.

Example 6 may include the system of any one of Examples 1 to 5, wherein the bus includes one or more of a system management bus or a dynamic random access memory bus.

Example 7 may include a debug apparatus comprising tunnel logic hardware, a set of debug registers, and a converter including an input port to receive one or more debug communications, a register manager to program, via a bus, the set of debug registers with debug information corresponding to the one or more debug communications, and a trigger component to instruct the tunnel logic hardware to transfer the debug information from the set of debug registers to one or more test access ports of a device having a microcontroller.

Example 8 may include the apparatus of Example 7, further including a control status register, wherein the converter includes a permission manager to detect that debug permission has been granted during a boot process, unlock the control status register in response to detection of the debug permission being granted during the boot process, and lock the control status register if the debug permission is not detected during the boot process.

Example 9 may include the apparatus of Example 8, wherein the permission manager is to activate, via an enable bit of the control status register, the tunnel logic hardware if the control status register is unlocked.

Example 10 may include the apparatus of Example 7, wherein the register manager is to write payload information to one or more payload registers in the set of debug registers and write control information to a control register in the set of debug registers.

Example 11 may include the apparatus of Example 10, wherein the control information is to include a debug command, a shift amount and a start signal, and wherein the start signal is to be programmed when the payload information is ready for transfer from the one or more payload registers.

Example 12 may include the apparatus of any one of Examples 7 to 11, wherein the set of debug registers are to be programmed via one or more of a system management bus or a dynamic random access memory bus.

Example 13 may include a method of operating a converter, comprising receiving one or more debug communications, programming, via a bus, a set of debug registers with debug information corresponding to the one or more debug communications, and instructing tunnel logic hardware to transfer the debug information from the set of debug registers to one or more test access ports of a device having a microcontroller.

Example 14 may include the method of Example 13, further including detecting that debug permission has been granted during a boot process, unlocking a control status register in response to detection of the debug permission being granted during the boot process, and locking the control status register if the debug permission is not detected during the boot process.

Example 15 may include the method of Example 14, further including activating, via an enable bit of the control status register, the tunnel logic hardware if the control status register is unlocked.

Example 16 may include the method of Example 13, wherein programming the set of debug registers includes writing payload information to one or more payload registers in the set of debug registers, and writing control information to a control register in the set of debug registers.

Example 17 may include the method of Example 16, wherein the control information includes a debug command, a shift amount and a start signal, and wherein the start signal is programmed when the payload information is ready for transfer from the one or more payload registers.

Example 18 may include the method of any one of Examples 13 to 17, wherein the set of debug registers are programmed via one or more of a system management bus or a dynamic random access memory bus.

Example 19 may include at least one non-transitory computer readable storage medium comprising a set of instructions, which when executed by a computing device, cause the computing device to receive one or more debug communications, program, via a bus, a set of debut registers with debug information corresponding to the one or more debug communications, and instruct tunnel logic hardware to transfer the debug information from the set of debug registers to one or more test access ports of a device having a microcontroller.

Example 20 may include the at least one non-transitory computer readable storage medium of claim 19, wherein the instructions, when executed, cause a computing device to detect that debug permission has been granted during a boot process, unlock a control status register in response to detection of the debug permission being granted during the boot process, and lock the control status register if the debug permission is not detected during the boot process.

Example 21 may include the at least one non-transitory computer readable storage medium of Example 20, wherein the instructions, when executed, cause a computing device to activate, via an enable bit of the control status register, the tunnel logic hardware if the control status register is unlocked.

Example 22 may include the at least one non-transitory computer readable storage medium of Example 19, wherein the instructions, when executed, cause a computing device to write payload information to one or more payload registers in the set of debug registers, and write control information to a control register in the set of debug registers.

Example 23 may include the at least one non-transitory computer readable storage medium of Example 22, wherein the control information is to include a debug command, a shift amount and a start signal, and wherein the start signal is to be programmed when the payload information is ready for transfer from the one or more payload registers.

Example 24 may include the at least one non-transitory computer readable storage medium of any one of Examples 19 to 23, wherein the set of debug registers are to be programmed via one or more of a system management bus or a dynamic random access memory bus.

Example 25 may include a debug apparatus comprising means for receiving one or more debug communications, means for programming, via a bus, a set of debug registers with debug information corresponding to the one or more debug communications, and means for instructing tunnel logic hardware to transfer the debug information from the set of debug registers to one or more test access ports of a device having a microcontroller.

Example 26 may include the apparatus of Example 25, further including means for detecting that debug permission has been granted during a boot process, means for unlocking a control status register in response to detection of the debug permission being granted during the boot process, and means for locking the control status register if the debug permission is not detected during the boot process.

Example 27 may include the apparatus of Example 26, further including means for activating, via an enable bit of the control status register, the tunnel logic hardware if the control status register is unlocked.

Example 28 may include the apparatus of Example 25, wherein the means for programming the set of debug registers includes means for writing payload information to one or more payload registers in the set of debug registers, and means for writing control information to a control register in the set of debug registers.

Example 29 may include the apparatus of Example 28, wherein the control information is to include a debug command, a shift amount and a start signal, and wherein the start signal is to be programmed when the payload information is ready for transfer from the one or more payload registers.

Example 30 may include the apparatus of any one of Examples 25 to 29, wherein the set of debug registers are to be programmed via one or more of a system management bus or a dynamic random access memory bus.

Techniques described herein may therefore achieve secure tunneling access to debug test ports on non-volatile memory storage units and other intelligent devices having standardize pinouts and form factors that restrict the addition of pins and/or debug connectors. Additionally, tunneling logic disable mechanisms may protect user privacy and increase security of the debug solution.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
a non-volatile memory storage unit including a microcontroller and one or more test access ports,
a bus,
tunnel logic hardware coupled to at least one of the one or more test access ports,
a set of debug registers coupled to the bus, and
a converter including,
an input port to receive one or more debug communications,
a register manager to program, via the bus, the set of debug registers with debug information corresponding to the one or more debug communications, and
a trigger component to instruct the tunnel logic hardware to transfer the debug information from the set of debug registers to the one or more test access ports.

2. The system of claim 1, wherein the register manager is to write payload information to one or more payload registers in the set of debug registers and write control information to a control register in the set of debug registers.

3. The system of claim 2, wherein the control information is to include a debug command, a shift amount and a start signal, and wherein the start signal is to be programmed when the payload information is ready for transfer from the one or more payload registers.

4. The system of claim 1, wherein the bus includes one or more of a system management bus or a dynamic random access memory bus.

5. An apparatus comprising:
tunnel logic hardware,
a set of debug registers, and
a converter including,
an input port to receive one or more debug communications,
a register manager to program, via a bus, the set of debug registers with debug information corresponding to the one or more debug communications, and
a trigger component to instruct the tunnel logic hardware to transfer the debug information from the set of debug registers to one or more test access ports of a device having a microcontroller.

6. The apparatus of claim 5, wherein the register manager is to write payload information to one or more payload registers in the set of debug registers and write control information to a control register in the set of debug registers.

7. The apparatus of claim 6, wherein the control information is to include a debug command, a shift amount and a start signal, and wherein the start signal is to be programmed when the payload information is ready for transfer from the one or more payload registers.

8. The apparatus of claim 5, wherein the set of debug registers are to be programmed via one or more of a system management bus or a dynamic random access memory bus.

9. A method comprising:
receiving one or more debug communications;

programming, via a bus, a set of debug registers with debug information corresponding to the one or more debug communications; and instructing tunnel logic hardware to transfer the debug information from the set of debug registers to one or more test access ports of a device having a microcontroller.

10. The method of claim 9, wherein programming the set of debug registers includes:

writing payload information to one or more payload registers in the set of debug registers; and writing control information to a control register in the set of debug registers.

11. The method of claim 10, wherein the control information includes a debug command, a shift amount and a start signal, and wherein the start signal is programmed when the payload information is ready for transfer from the one or more payload registers.

12. The method of claim 9, wherein the set of debug registers are programmed via one or more of a system management bus or a dynamic random access memory bus.

13. At least one non-transitory computer readable storage medium comprising a set of instructions, which when executed by a computing device, cause the computing device to:

receive one or more debug communications;

program, via a bus, a set of debug registers with debug information corresponding to the one or more debug communications; and instruct tunnel logic hardware to transfer the debug information from the set of debug registers to one or more test access ports of a device having a microcontroller.

14. The at least one non-transitory computer readable storage medium of claim 13, wherein the instructions, when executed, cause a computing device to:

write payload information to one or more payload registers in the set of debug registers; and write control information to a control register in the set of debug registers.

15. The at least one non-transitory computer readable storage medium of claim 14, wherein the control information is to include a debug command, a shift amount and a start signal, and wherein the start signal is to be programmed when the payload information is ready for transfer from the one or more payload registers.

16. The at least one non-transitory computer readable storage medium of claim 13, wherein the set of debug registers are to be programmed via one or more of a system management bus or a dynamic random access memory bus.

17. The system of claim 1, further comprising:

a permission manager to: detect that debug permission has been granted during a boot process, unlock a control status register in response to detection of the debug permission being granted during the boot process, and/or lock the control status register if the debug permission is not detected during the boot process.

18. The apparatus of claim 5, further comprising:

a permission manager to: detect that debug permission has been granted during a boot process, unlock a control status register in response to detection of the debug permission being granted during the boot process, and/or lock the control status register if the debug permission is not detected during the boot process.

19. The method of claim 9, further comprising:

detecting that debug permission has been granted during a boot process; unlocking a control status register in response to detection of the debug permission being granted during the boot process; and/or locking the control status register if the debug permission is not detected during the boot process.

20. The at least one non-transitory computer readable storage medium of claim 13, wherein the instructions, when executed, cause a computing device to:

detect that debug permission has been granted during a boot process, unlock a control status register in response to detection of the debug permission being granted during the boot process, and/or lock the control status register if the debug permission is not detected during the boot process.

* * * * *